US009584531B2

(12) United States Patent
Belenky

(10) Patent No.: US 9,584,531 B2
(45) Date of Patent: Feb. 28, 2017

(54) OUT-OF BAND IP TRACEBACK USING IP PACKETS

(71) Applicant: Quantum RDL, Inc., New York, NY (US)

(72) Inventor: Andrey Belenky, Staten Island, NY (US)

(73) Assignee: Andrey Belenky, Staten Island, NY (US)

( * ) Notice: Subject to any disclaimer, the term of this patent is extended or adjusted under 35 U.S.C. 154(b) by 0 days.

(21) Appl. No.: 14/719,918

(22) Filed: May 22, 2015

(65) Prior Publication Data
US 2015/0281265 A1    Oct. 1, 2015

Related U.S. Application Data

(63) Continuation of application No. 13/775,814, filed on Feb. 25, 2013, now Pat. No. 9,060,019.

(51) Int. Cl.
*H04L 29/06* (2006.01)

(52) U.S. Cl.
CPC ........ *H04L 63/1408* (2013.01); *H04L 63/126* (2013.01); *H04L 63/1458* (2013.01); *H04L 63/1466* (2013.01)

(58) Field of Classification Search
CPC ............. H04L 63/1408; H04L 63/1458; H04L 63/1466
USPC ............................................. 726/22; 709/228
See application file for complete search history.

(56) References Cited

U.S. PATENT DOCUMENTS

| 5,835,726 A | 11/1998 | Shwed et al. |
| 6,975,619 B1 | 12/2005 | Byers et al. |
| 6,978,223 B2 | 12/2005 | Milliken |
| 6,981,158 B1 | 12/2005 | Sanchez et al. |
| 7,200,105 B1 | 4/2007 | Milliken et al. |

(Continued)

FOREIGN PATENT DOCUMENTS

WO    WO0159584 A1    8/2001

OTHER PUBLICATIONS

Chen, "Implementation of SDN Based Network Intrusion Detection and Prevention System", Sep. 2015, IEEE, p. 141-146.*

(Continued)

*Primary Examiner* — Morshed Mehedi
*Assistant Examiner* — Gregory Lane
(74) *Attorney, Agent, or Firm* — Hymowitz Law Group, PLLC

(57) ABSTRACT

A method and system for tracing internet protocol packets is disclosed. One aspect of the method involves generating traceback packets containing information relating to their origin, destination, and encountered devices. The generated traceback packets can differ depending on the network configuration and Internet traffic scenarios. Another aspect involves analyzing incoming Internet traffic and generating traceback packets based on the performed analysis. Another aspect involves discovering a denial-of-service attack. Another aspect involves modifying operational parameters in response to the attack. One aspect of the system involves traceback servers, which can collect and provide traceback information to the public or on a private network. Another aspect involves the dissemination of traceback information to interested and/or authorized parties.

18 Claims, 15 Drawing Sheets

(56) References Cited

U.S. PATENT DOCUMENTS

| | | | |
|---|---|---|---|
| 7,415,018 B2 | 8/2008 | Jones et al. | |
| 7,444,515 B2 | 10/2008 | Dharmapurikar et al. | |
| 7,565,426 B2 | 7/2009 | Jones et al. | |
| 7,752,324 B2 | 7/2010 | Hamadeh et al. | |
| 7,873,997 B2 | 1/2011 | Belenky et al. | |
| 7,908,654 B2 | 3/2011 | Belenky et al. | |
| 2003/0149777 A1* | 8/2003 | Adler | H04L 63/1458 709/228 |
| 2003/0172289 A1* | 9/2003 | Soppera | H04L 63/0823 726/13 |
| 2004/0049695 A1* | 3/2004 | Choi | H04L 63/1408 726/23 |
| 2004/0093521 A1 | 5/2004 | Hamadeh | |
| 2005/0060582 A1* | 3/2005 | Choi | H04L 63/1441 726/4 |
| 2005/0086520 A1 | 4/2005 | Dharmapurikar et al. | |
| 2006/0085861 A1 | 4/2006 | Belenky et al. | |
| 2006/0272018 A1* | 11/2006 | Fouant | H04L 63/1416 726/23 |
| 2007/0157314 A1 | 7/2007 | Hong et al. | |
| 2010/0030891 A1* | 2/2010 | Kim | H04L 63/0281 709/224 |
| 2011/0026529 A1 | 2/2011 | Majumdar et al. | |
| 2011/0138463 A1* | 6/2011 | Kim | H04L 63/1425 726/22 |
| 2011/0252265 A1* | 10/2011 | Iwami | H04N 19/645 713/401 |
| 2012/0023572 A1 | 1/2012 | Williams et al. | |
| 2013/0021530 A1* | 1/2013 | Takahashi | H04N 5/247 348/706 |

OTHER PUBLICATIONS

Hu, "A General Framework of Source Address Validation and Traceback for IPv4/IPv6 Transition Scenarios", Dec. 2013, IEEE, p. 63-73.
V. Paxson, An analysis of using reflectors for distributed denial-of-service attacks, ACM SIGCOMM, Computer Communication Review, vol. 31 Issue 3, Jul. 2001, pp. 38-47.
A. Belenky et al., On IP traceback, IEEE Communications Mag., Jul. 2003 vol. 41, No. 7., pp. 142-153.
J. Li et al., SAVE Source Address Validity Enforcement Protocol, IEEE INFOCOM 2002, pp. 1557-1566.
A.C. Snoren et al., Single-packet IP traceback, IEEE/ACM Trans. Networking. Dec. 2002, pp. 721-734, vol. 10, No. 6.
A. Belenky. "IP Tracebook with Deterministic Packet Marking (DPM)," Ph.D. dissertation, New Jersey Institute of Technology, Oct. 2003.
D. Dean et al., An algebraic approach to IP traceback, ACM Trans. on Information and System Security, (TISSEC), May 2002, pp. 119-137, vol. 5, No. 2.
D. Moore et al., Inferring internet denial of service activity, Proc. of 10th USENIX Service Symposium, 2001, pp. 9-22.
S. McCreary et al., Trends in wide area IP traffic patterns, ITC Specialist Seminar, CAIDA, 2000.
D. Wei et al., "Implementing IP Tracebook in the Internet—An ISP Perspective," Proc. 3rd Annual IEEE Workshop on Information Assurance, West Point, NY, pp. 326-332, Jun. 17-19, 2002.
D.X. Song et al., Advanced and authenticated marking schemes for IP traceback, Proc. of INFOCOM 2001, 2001, pp. 878-886, vol. 2.
H. Burch et al., Tracing anonymous packets to their approximate source, Proc. of 2000 USENIX LISA Conference, Dec. 2000, pp. 319-327.
H. Chang et al., DecIdUouS: Decentralized source identification for network intrusions, Proc. of 6th IFEP/IEEE International Symposium on Integrated Net. Management, May 1999, pp. 701-714.
S. Bhattacharyya et al., Pop-Level and Access-Link-Level Traffic Dynamics in a Tier-I POP, IMW 2001 Proceedings of the 1st ACM SIGCOMM Workshop on Internet Measurement.

L. Subramanian et al., Characterizing the Internet hierarchy from multiple vantage points, Proceedings of INFOCOM 2002 Twenty-First Annual Joint Conference of the IEEE Computer and Communications Societies, Jun. 2002, pp. 618-627, vol. 2.
M. Bellovin et al., ICMP Traceback Message, Internet Draft Feb. 23, [Online]. Available: http://tools.ietf.org/html/draft-ietf-itrace-04.
P. Ferguson et al., Network ingress filtering: defeating denial of service attacks which employ IP source address spoofing, RFC 2827, May 2000.
P. Srisuresh et al., Traditional IP network address translator (traditional NAT), RFC 3022, Jan. 2001.
R. Stone, Center Track: An IP overlay network for tracking DoS floods, Proc. of 9th USENIX Security Symposium, Aug. 2000.
R.K.C. Chang, Defending against flooding-based distributed denial-of-service attacks: A tutorial, IEEE Commun. Mag. Oct. 2002, pp. 42-51, vol. 40, No. 10.
S. Matsuda et al., Design and implementation of unauthorized access tracing system, Proc. of the 2002 Symposium on Applications and the Internet, Jan./Feb. 2002, pp. 74-81.
S. Savage et al., Network support for IP Traceback, IEEE/ACM Trans. Networking, Jun. 2001, pp. 226-237, vol. 9, No. 3.
D. Schnackenberg et al., Cooperative Intrusion Traceback and Response Architecture (CITRA), DISCEX 2001 Conference Proceedings, vol. 1, pp. 56-68.
S.F. Wu et al., On design and evaluation of 'intention-driven' ICMP traceback, Proc. of 10th Inter. Conf. on Computer Comm. and Networks, Oct. 2001, pp. 159-165.
V. Paxson, An analysis of using reflectors for distributed denial-of-service attacks, ACM SIGCOMM Computer Communication Review, Jul. 2001, pp. 38-47, vol. 31, No. 3.
T. Baba et al., Tracing network attacks to their sources, IEEE Internet Comput., Mar./Apr. 2002, pp. 20-26, vol. 6, No. 2.
T.W. Doeppner, Using router stamping to identify the source of IP packets, Proc. of 7th ACM Inter. Conf. on Computer Comm. and Networks, Nov. 2000, pp. 184-189.
S. M. Khattab et al., Proactive server roaming for mitigating denial-of-service attacks, ITRE 2003, pp. 286-290.
C. Shannon et al., Beyond folklore: observations on fragmented traffic, IEEE/ACM. Trans. Networking, Dec. 2002, pp. 709-720, vol. 10, No. 6.
T. Bass., Intrusion Detection Systems and Multisensor Data Fusion., Communications of the ACM, Apr. 2000/vol. 43, No. 4, pp. 99-105.
K. J. Houle et al., Trends in Denial of Service Attack Technology, Oct. 2001, CERT Coordination Center.
N. Ansari et al., "Internet Deployment of DPM-based IP Traceback." Journal of Computing and Information Technology 16.2 (2008): 109-118.
S. Gibson, The Strange Tale of Denial of Service Attacks Against grc.com, Mar. 5, 2002, Gibson Research Corporation, Technical Report.
A. C. Snoeren et al., Hash-based IP traceback; Aug. 27-31, 2001 ;SIGCOMM'01 Proceedings; ACM; p. 3-14.
S. Gibson, DRDoS: Distributed reflector denial of service, Feb. 2002, Gibson Research Corporation, Technical Report.
A. Feldman et al., IP network configuration for intradomain traffic engineering, IEEE Network, Sep./Oct. 2001, pp. 46-57, vol. 15, No. 5.
K. Park et al., On the effectiveness of Route-Based Packet Filgering for Distributed DoS Attack Prevention in Power-Law Internets, Proc. of the 2001 Conference on Applications, Technologies, Architectures, and Protocols for Computer Communications, Aug. 2001, pp. 15-26.
L. Gao, On inferring autonomous system relationships in the internet, IEEE/ACM Trans. Networking, Dec. 2001, pp. 733-745, vol. 9, No. 6.
L. Gao et al., Stable internet routing without global coordination, IEEE/ACM Trans. Networking, Dec. 2001, pp. 681-692, vol. 9, No. 6.
A. Belenky et al., "On deterministic packet marking." Computer Networks 51.10 (2007): 2677-2700.

(56) References Cited

OTHER PUBLICATIONS

B. Wang et al., "A denial-of-service-resistant IP traceback approach." In Computers and Communications, 2004. Proceedings. ISCC 2004. Ninth International Symposium on, vol. 1, pp. 351-356. IEEE, 2004.
T. Korkmaz et al. "Single packet IP traceback in AS-level partial deployment scenario." International Journal of Security and Networks 2.1 (2007): 95-108.
L. Santhanam et al., "Taxonomy of IP traceback." Journal of Information Assurance and Security (JIAS) 1.2 (2006):79-94.
Y. Xiang et al., "Flexible deterministic packet marking: an IP traceback system to find the real source of attacks." Parallel and Distributed Systems, IEEE Transactions on 20.4 (2009): 567-580.
S. Peng, "Secure Single Packet IP Traceback Mechanism to Identify the Source" (ICITST), May 24, 2011.
H. F. Lipson, Tracking and Tracing Cyber-Attacks: Technical Challenges and Global Policy Issues, CERT.RTM. Coordination Center, Nov. 2002.
J. McHugh et al., Defending Yourself: The Role of Intrusion Detection Systems, Software Engineering Institute, IEEE Software Sep./Oct. 2007, pp. 42-51.
H. Aljifri, IP Traceback: A New Denial-of-Service Deterrent?, IEEE Computer Society, IEEE Security & Privacy 2003, pp. 24-31.

\* cited by examiner

OUT-OF BAND IP TRACEBACK USING IP PACKETS

CLAIM OF PRIORITY

This application is a continuation of U.S. application Ser. No. 13/775,814 filed on Feb. 25, 2013.

FIELD OF INVENTION

This invention relates to internet protocol (IP) traceback. Specifically it relates to a method of IP traceback that relies on generation of new IP packets.

BACKGROUND

IP traceback is a method of identifying the origin of packets on the Internet. IP traceback may have various applications in network management and security.

Various IP traceback methods rely on packet marking, i.e., transmitting traceback information inside "live" packets. For such transmission of traceback data, these methods rely on rarely used fields of the IP header, such as the Reserved Flag and Fragmentation ID field. Typically traceback data is an IP address, which is a 32-bit string. Because fewer than 32 bits are unused and available in the typical IP header, the transmitted IP address must be split in two or more parts. Each of these parts is then separately transmitted together with other information required for the IP address reconstruction. The process of determining information to be inserted into a packet and then inserting it is frequently referred to as "marking."

The splitting of the transmitted IP addresses results in the victim receiving only parts of the transmitted IP addresses, which presents several problems.

First, complex, and memory- and processor-intensive reconstruction procedures are required to ascertain the actual transmitted IP addresses. These procedures match parts of the embedded and transmitted IP addresses to assemble complete IP addresses. For real-time traceback, these reconstruction procedures must be performed while the victim is being attacked.

Second, inevitably, as the number of attacking entities, such as slaves and reflectors, increases, the number of false positive identifications also increases. Some algorithms have been developed to increase the number of reconstructed IP addresses while keeping the false positive rate under a certain predetermined value, such as 1%. At the moment, several thousand simultaneous attackers seems to be the limit for currently existing systems.

Third, because, typically, the fragmentation ID field is used for transmission of the traceback information, IP fragmentation is adversely affected. Since information used for reconstruction of fragmented packets has been overwritten with traceback information, it may be impossible to reconstruct the original packet.

A key benefit of the marking-based traceback methods is that the traceback information reaches as far as the attack packets. Some traceback methods rely on the generation of new ICMP packets that carry traceback information. While such ICMP-based methods do not present the above problems associated with packet marking, traceback using ICMP packets is problematic because ICMP packets are frequently filtered.

Accordingly, there is a need for an out-of-band traceback method that does not present limitations of packet marking and ICMP traceback.

SUMMARY

In accordance with one embodiment of the present invention, a method and system for generating traceback packets is disclosed. In one embodiment, the traceback packets comprise a source internet protocol address, a destination internet protocol address, and a payload comprising an identifier of a computer network device. In another embodiment, the traceback packets comprise a source internet protocol address, a destination internet protocol address, and a payload comprising multiple computer network device identifiers.

In accordance with one embodiment of the present invention, traceback-enabled devices receive a request packet and generate a traceback packet escorting the request packet to its destination. In another embodiment, traceback-enabled devices flip the source and destination addresses in the generated traceback packet, and send it directly to the alleged source of the request packet. In another embodiment, traceback-enabled devices receive traceback packets comprising only a single device identifier in the payload, and generate a traceback packet with two internet protocol addresses in the payload.

In another embodiment, the traceback system comprises a traceback server capable of storing and providing information relating to traceback efforts. In one embodiment, the traceback server is publicly accessible on the Internet. In another embodiment, the traceback server is located on a private network.

In another embodiment, traceback-enabled devices collect information relating to received packets, including traceback packets. In another embodiment, traceback-enabled devices are capable of analyzing data relating to received Internet traffic. In another embodiment, traceback-enabled devices are capable of providing information relating to their traceback operations and Internet traffic. In another embodiment, traceback-enabled devices are capable of reacting to their own data analysis. In another embodiment traceback-enabled devices adapt to Internet traffic conditions and manage Internet traffic accordingly.

DETAILED DESCRIPTION

Overview of Denial of Service Attacks

In the context of IP traceback, denial-of-service (DoS) attacks are of interest. The purpose of these attacks is to overwhelm victim's resources to the point that it cannot serve legitimate requests. Examples of resources typically targeted by denial of service attacks are network links, processors, and memory. One key feature of such attacks (as opposed to intrusions, for example) is that the attacker is not attempting to retrieve any information from the victim. Therefore, the perpetrator does not care about receiving any information back from the victim. This allows the perpetrator to conceal his true identity and location, by using other computers and by spoofing his IP address and other information transferred in the IP packets. "Spoofing" refers to a situation where a malicious computer creates an IP packet, and instead of populating the source address field of the packet with its true IP address, populates that field with a fictitious IP address or an IP address of another computer. This creates the illusion that the packet was sent by someone other than the attacker.

Figure 1A:
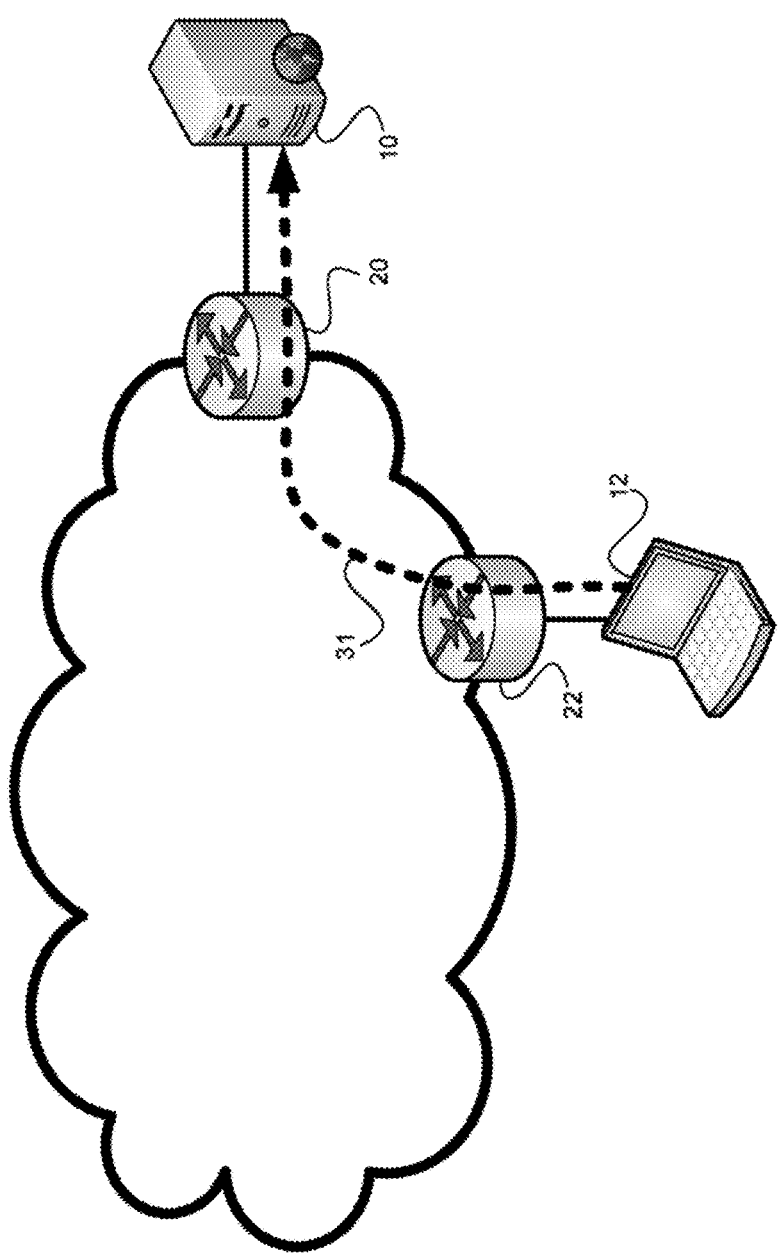
FIG. 1A illustrates a basic denial of service attack on a victim computer.

FIGS. 1A-D show various attack models. FIG. 1A shows victim 10, which can be a single computer, a group of computers, such as a server farm, or any other collection of computer and network devices providing a service. For example, victim 10 may be a network of computers, including servers and network equipment underlying the functionality of a website. FIG. 1A also shows an attacker 12, which is typically a single computer. Because the perpetrator operating attacker 12 is not attempting to retrieve any information from victim 10, attacker 12 can spoof its IP address and other information in the outgoing IP packet.

In a very simplistic DoS attack, attacker 12 sends spoofed packets to victim 10. This kind of an attack is ineffective because a typical attacker 12 would not be able to generate enough traffic to deny service of victim 10 to legitimate users. Naturally, a powerful server would be able to inflict more damage than a personal computer.

Figure 1B:
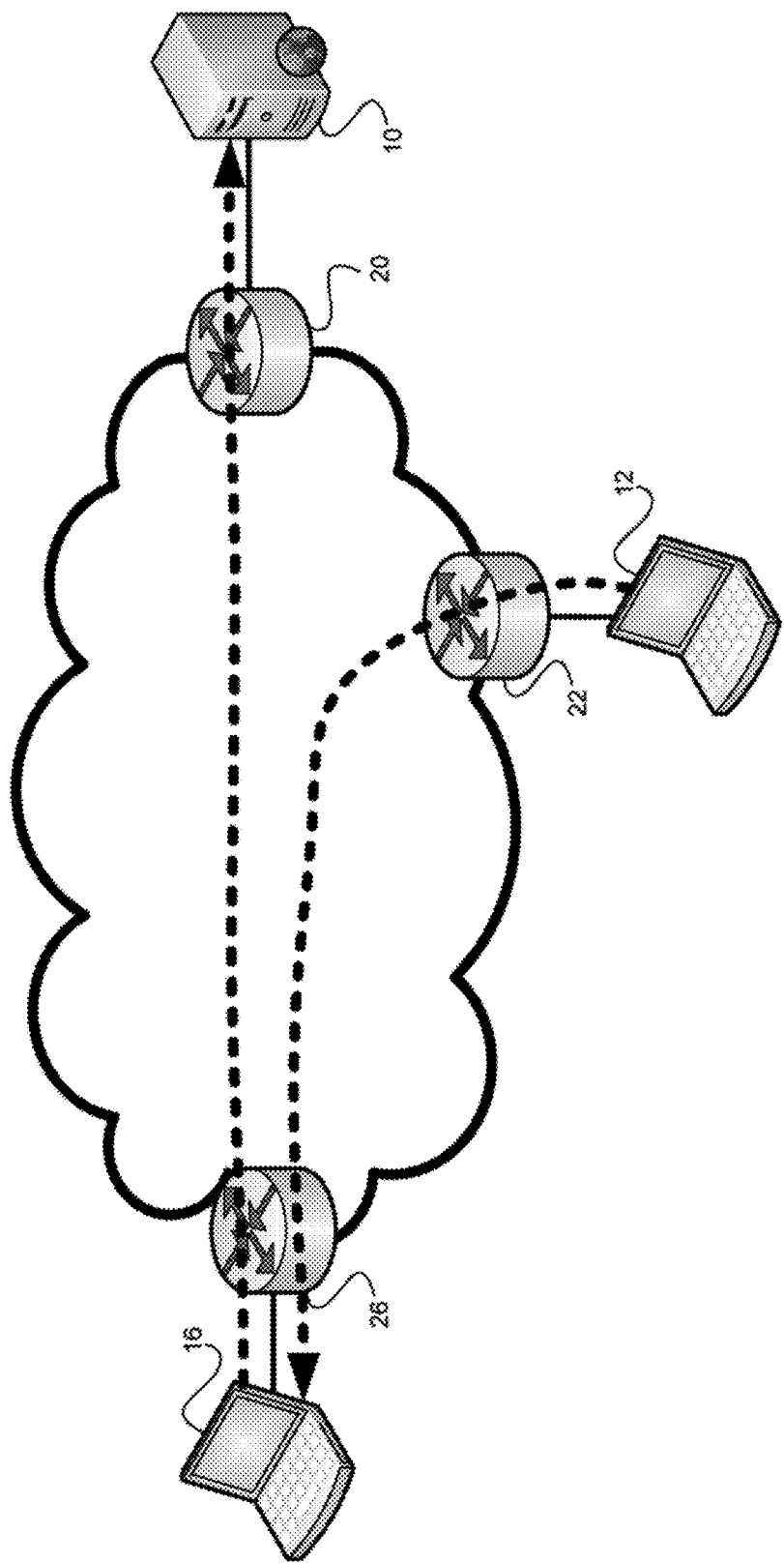
FIG. 1B illustrates a distributed denial of service attack on a victim computer.

The perpetrator has greater chances of denying victim 10's service to legitimate users if he employs multiple computers. FIG. 1B illustrates this scenario. Such an attack typically refers to as distributed denial of service attack (DDoS). For this purpose, the perpetrator, through attacker 12 gains control over one or more slaves 16, also sometimes called zombies. Slaves 16 are typically unsecured or poorly secured computers, frequently operated by unsophisticated users. The perpetrator gains control of these computers by using operating system security vulnerabilities, rogue programs, etc. The exact methods of taking control over slaves 16 are beyond this disclosure. The control does not have to be complete; for orchestrating a DDoS attack, it may be enough that slaves 16 execute a program in the background. The more slaves 16 the perpetrator can amass, the more expansive will be his attack. If the perpetrator gained control over several hundred or several thousand slaves, he can install a rogue program on each of the hijacked computers. This program executes at a predetermined time or in response to the perpetrator's message. As a result of this program's execution, slaves may start flooding victim 10 with bogus requests. This DDoS attack that involves hundreds or thousands computers is much more severe than an attack that relies on a single attacker 12.

Figure 1C:
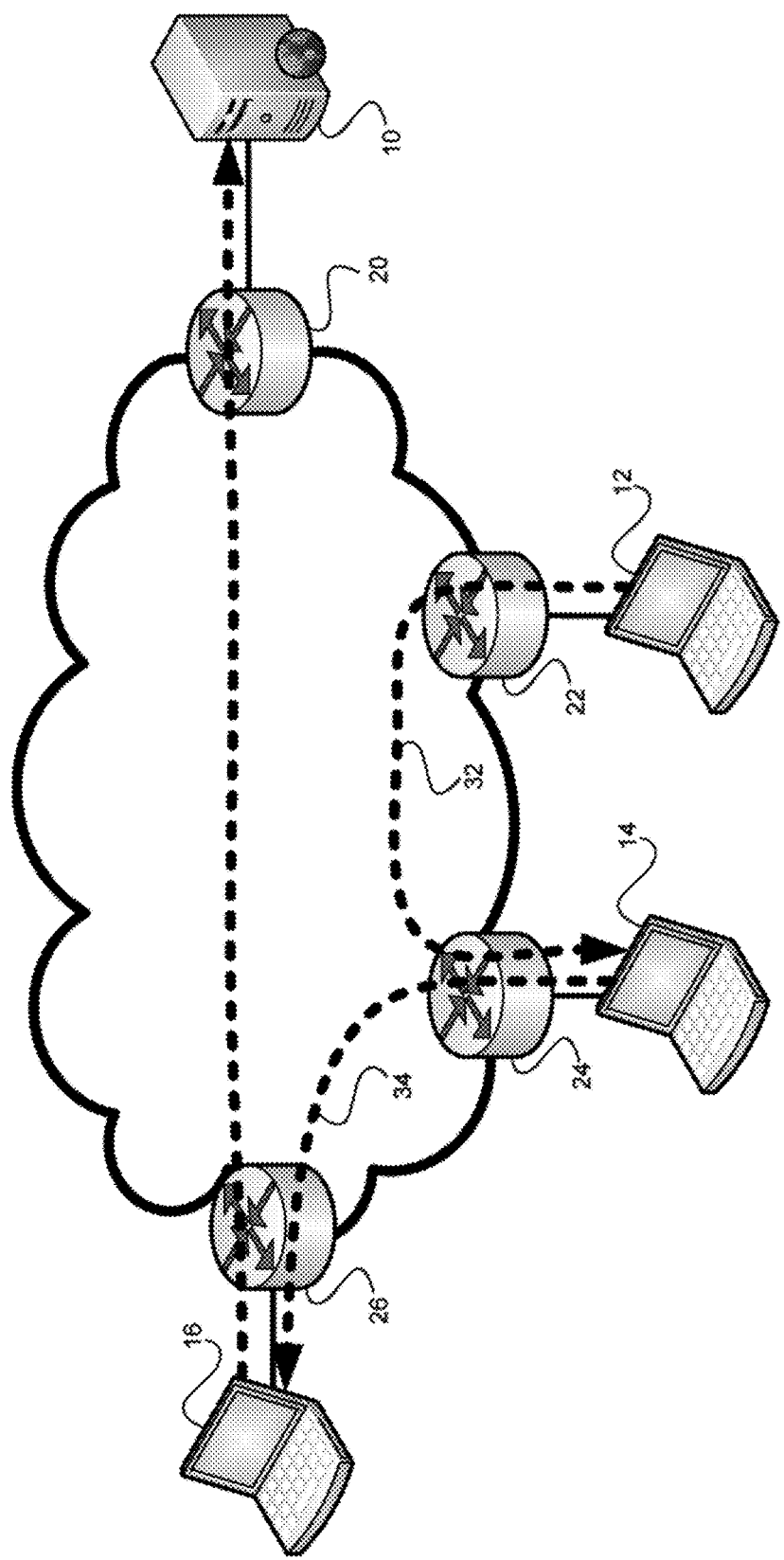
FIG. 1C illustrates a distributed denial of service attack on a victim computer utilizing a number of stepping stone computers.

As shown in FIG. 1C, to cover his tracks when accessing slaves 16, the perpetrator uses one or more computers over which he has greater control, instead of making a direct connection from attacker 12. These computers are referred to as stepping stones 14. The perpetrator can use a string of stepping stones 14, accessing one stepping stone through another. Each subsequently accessed stepping stone would only have information about the previous one, and not about attacker 12.

Figure 1D:
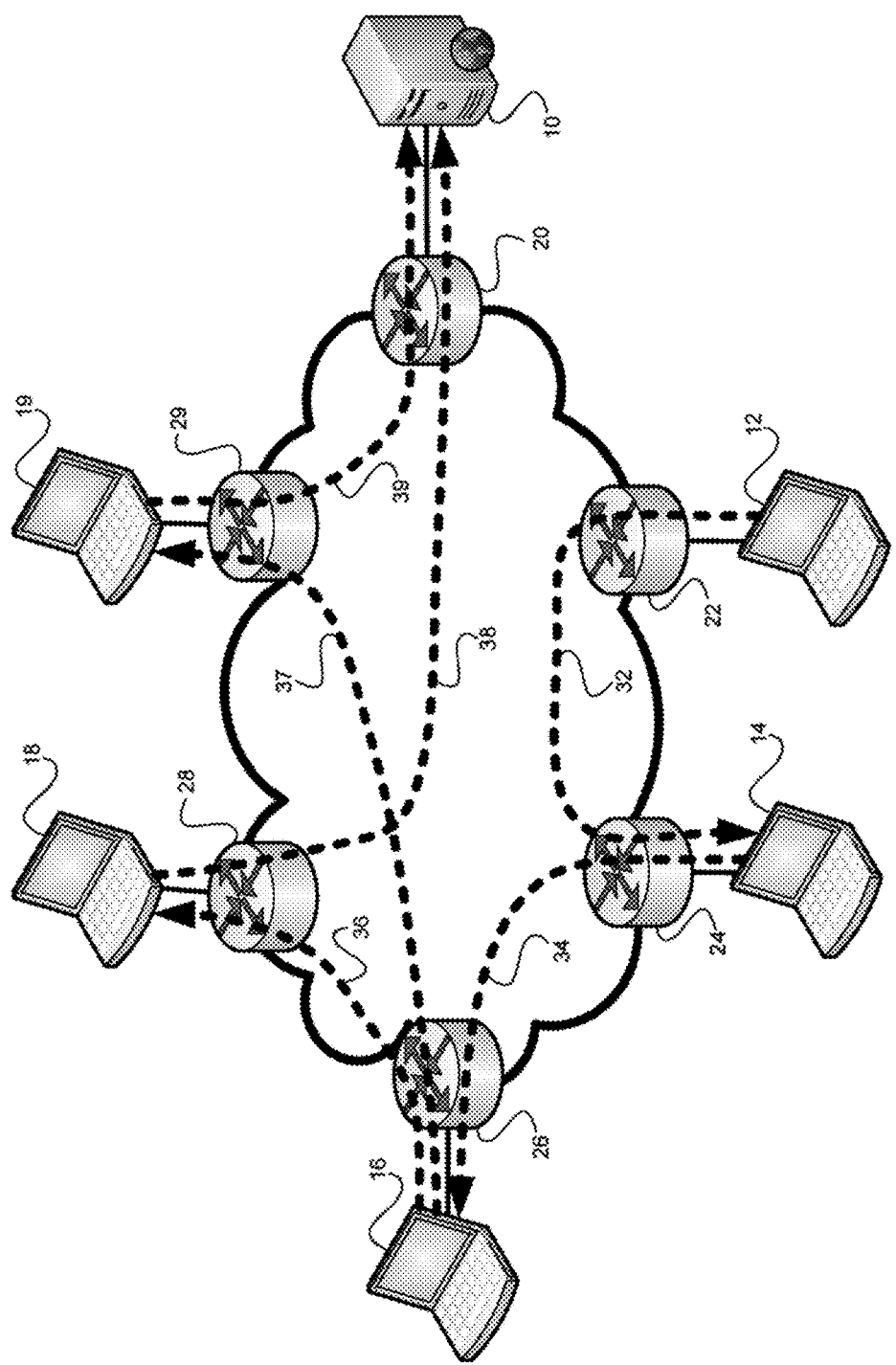
FIG. 1D illustrates a distributed denial of service attack on a victim computer utilizing several reflector computers.

While the perpetrator can multiply the number of computers sending packets to victim 10 by using slaves 16, he can increase this number even more by using reflectors 18. As shown in FIG. 1D, reflectors 18 are computers, that have not been compromised, which are configured to respond to users' requests. A typical example of such a computer is a Web server. Under normal operation, a user's computer and reflectors 18 engage in exchange of packets. If the source address in the IP packet is spoofed to be victim 10's address, then reflector 18 directs its response to victim 10. Victim 10 did not send any IP packets to reflectors 18, but receives responses that occupy victim 10's network bandwidth, processing capacity, memory, and other resources. Theoretically, there is an unlimited number of potential reflectors 18 on the Internet because every server configured to accept requests from public can be used as a reflector.

In a reflector-based DDoS attack, slaves 16 send IP packets, in which the source address is spoofed to be that of victim 10, to reflectors 18. Over the course of the attack, slaves can send such packets to a large variety of reflectors 18. Reflectors 18 send response IP packets to victim 10, thus unknowingly participating in the attack. Of course, attacker 12 can send packets to reflectors directly, without using slaves 16.

The perpetrator can also orchestrate what is known as a mixed DDoS, where slaves 16, and possibly attacker 12 and stepping stones 14, send IP packets to both victim 10 and reflectors 18.

Topology

Figure 2A:
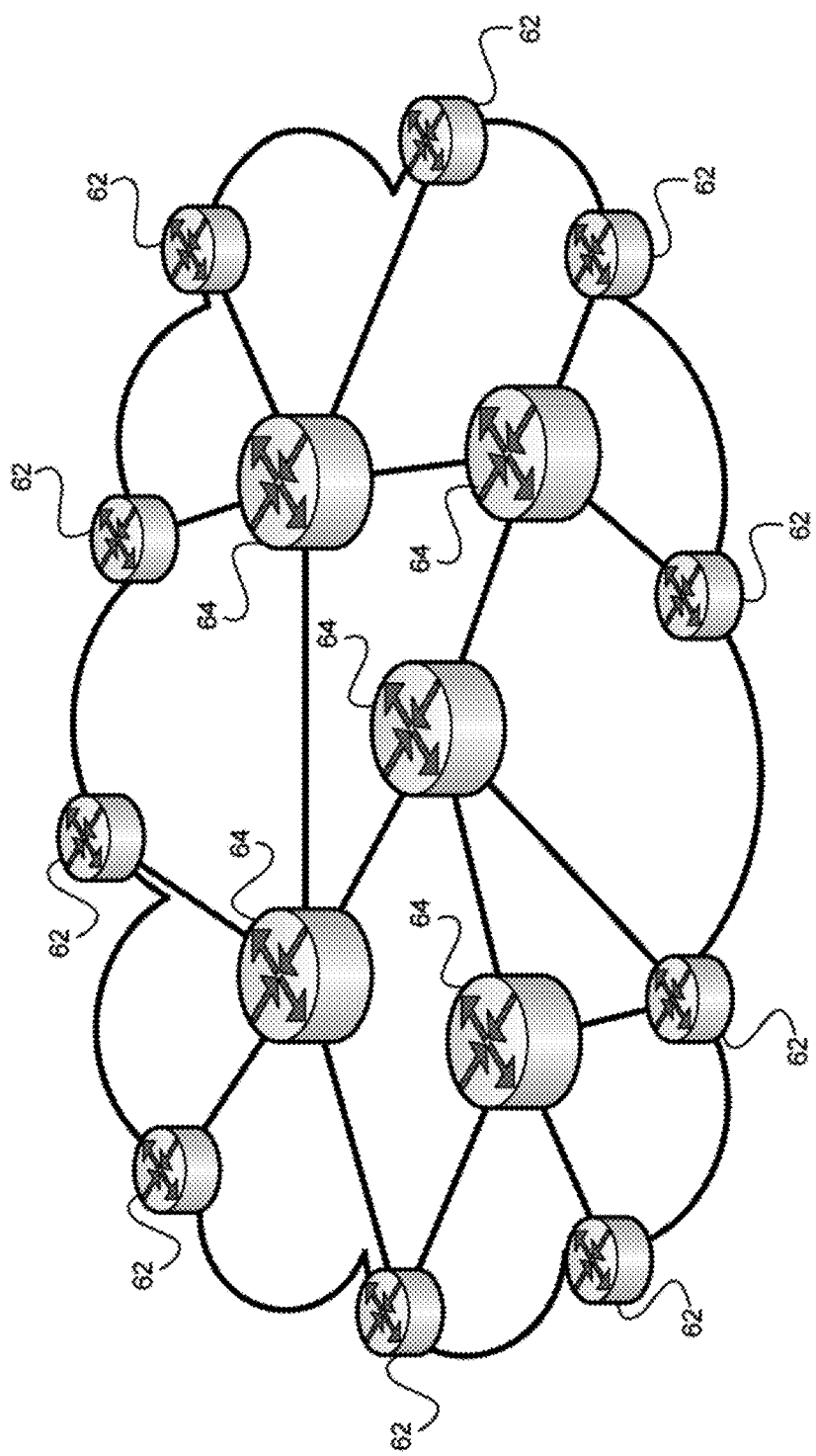
FIG. 2A illustrates a simplified network diagram of the Internet.
Figure 2B:
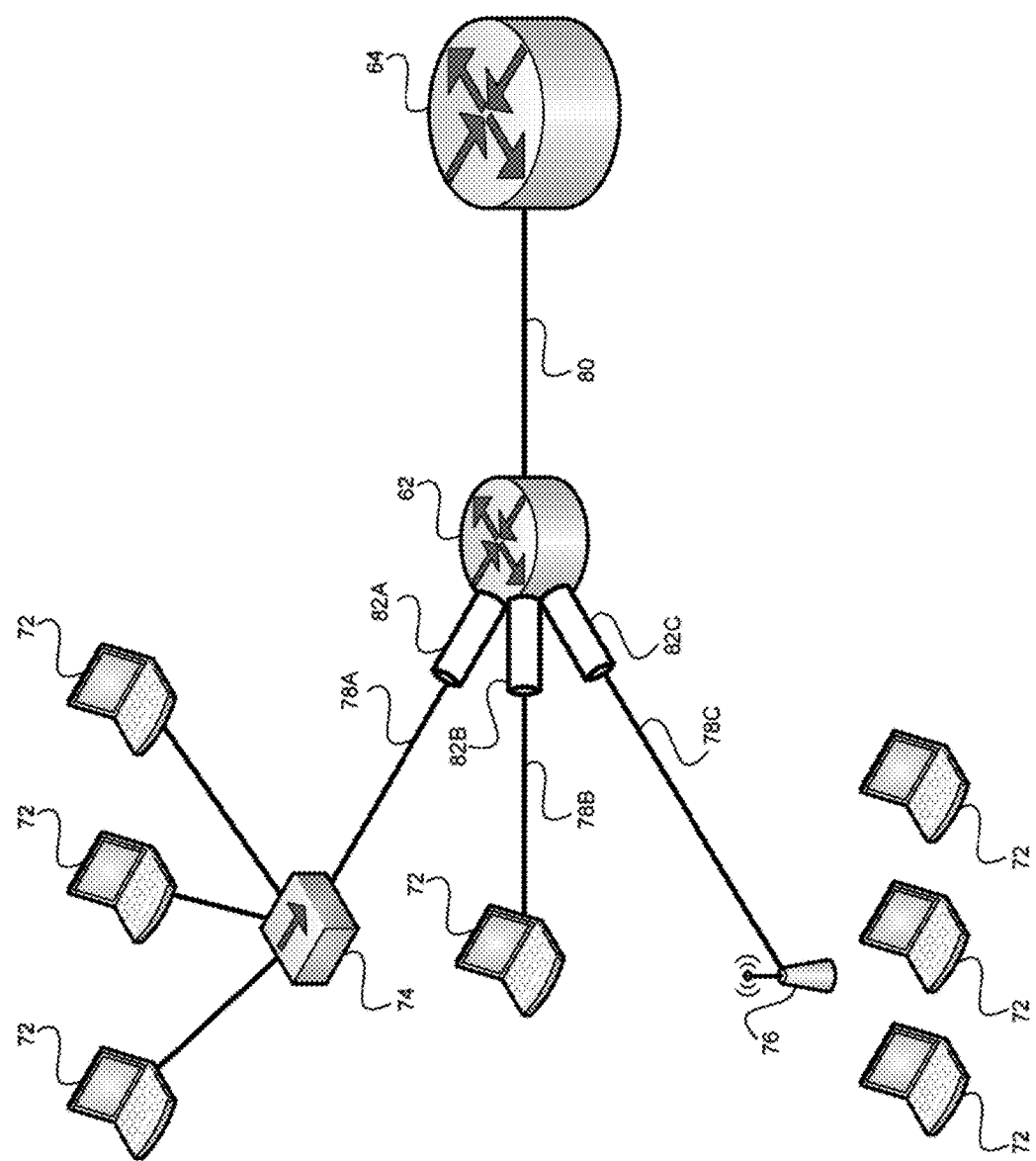
FIG. 2B illustrates several possible connections to the Internet.

FIG. 2A shows a simplified network diagram of the Internet. In principal, on the Internet, there are network devices, such as routers 62, to which user equipment connects directly, and devices to which user equipment does not connect directly, such as routers 64. FIG. 2B illustrates user equipment connected to the internet through router 62, including computers 72, a cable modem 74, and a wireless access point 76. The routers to which user equipment connects directly have interfaces for this purpose. In particular, an Internet Service Provider (ISP) router has some interfaces that are configured for user equipment connections and other interfaces configured for connection to other networking equipment. In the example illustrated in FIG. 2B, ISP router 62 has three interfaces 82A, 82B, and 82C for communicating with customer equipment.

The interfaces 82A, 82B, and 82C, where user traffic enters an ISP are referred to as ingress interfaces. Preferably, the ingress interfaces should be enabled for out-of-band IP traceback using IP packets. Once enabled, these interfaces function independently of each other and may even be configured with some different parameters.

For purposes of IP traceback, only ingress interfaces should be enabled because, the path that an attack packet takes is immaterial. Therefore, for IP traceback, it is preferable that all ingress interfaces on the Internet are enabled for out-of-band IP traceback using IP packets. Traceback would still be possible even if not all ingress interfaces are so enabled, unless the computer being traced connects to the Internet though the interface on which out-of-band IP traceback using IP packets is not enabled.

The device that has out-of-band IP traceback using IP packets is referred to as traceback-enabled device. Preferably, traceback-enabled device is a router interface. In some embodiments, it can be a router or a switch. In general, traceback-enabled interface can be any device that has its own IP address.

Preferably, traceback-enabled devices form a closed perimeter. This ensures that attack IP packets do not enter the Internet without passing through a traceback-enabled device. It is possible that an ISP may refuse to participate in out-of-band traceback, and will refuse to equip its devices with traceback capabilities. Yet, this possibility is also foreseen and addressed by the method described herein. In the case of an uncooperative ISP, a traceback-enabled device may not be the ingress interface, but may be an interface of the next tier ISP through which the uncooperative ISP connects to the rest of the Internet. In this scenario, the traceback mechanism may not be as precise due to the loss of data from the uncooperative ISP's routers, but at the very least the traceback data will point to the uncooperative ISP as the compromised network.

Basic Principle

The basic principle of out-of-band IP traceback using IP packets is that a traceback-enabled device generates a new traceback packet for approximately every n packets that it processes. In one embodiment, for every received packet, the traceback-enabled device generates a random number. If this random number generated for a given packet is less than 1/n, then the traceback-enabled device generates a traceback packet. The traceback-enabled device creates the traceback-packet and inserts its own IP address as payload. The traceback-enabled device creates the traceback packet so it arrives to the same destination and passes through the same filters as the reference packet (i.e., the packet for which the random number was less than 1/n.).

To accomplish this, the traceback-enabled device copies the IP header fields Source Address (SA) and Destination Address (DA) from the reference packet to the traceback packet. In some embodiments, the traceback enabled device also copies Version, Differentiated Services Code Point (DSCP), Explicit Congestion Notification (ECN), Time To Live (TTL), Protocol, and Identification from the reference packet to the traceback packet. Of course, the traceback-enabled device does not copy from the reference packet to the traceback packet the fields that are determined based on the information contained in a given packet, such as Total Length and Checksum. Instead, the traceback-enabled device determines the values of these fields and populates them. The traceback-enabled device sets the Fragment Offset field to 0, and the Fragment Flag to 0. Importantly, the traceback-enabled device sets the Reserved Flag to 1. This is how potential victims recognize that the traceback packet contains traceback information. In some embodiments, the traceback enabled device also copies from the reference packet to the traceback packet headers of the higher level protocols, such as TCP, UDP, HTTP, FTP. In other embodiments, even though the traceback-enabled device copies from the reference packet to the traceback packet the value of the Protocol field, the traceback-enabled device does not copy the headers of the higher-level protocols.

Figure 3:
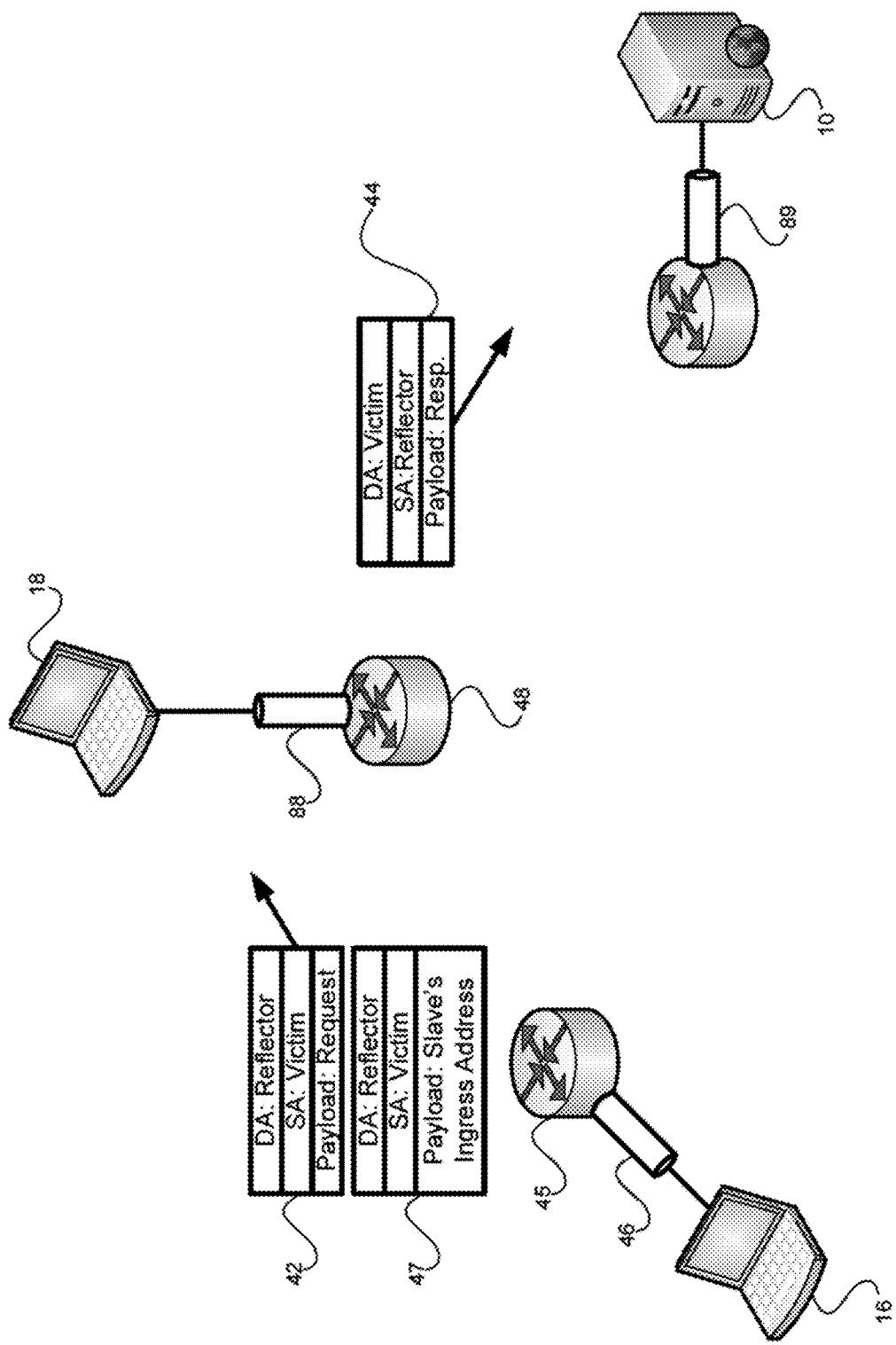
FIG. 3 illustrates a basic traceback mechanism and the actors involved.

FIG. 3 illustrates the basic traceback packet mechanism and the actors involved. Computer slave 16 is connected to a traceback-enabled device 46 (on router 45). When slave 16 generates a packet 42 directed to reflector 18, whether a legitimate packet or a spoofed request by victim 10, the traceback-enabled device 46 determines whether packet 42 is a reference packet. If packet 42 is selected as a reference packet, the traceback-enabled device 46 generates traceback packet 47, setting the destination address to that of reflector 18, the source address to that of the victim 10 (since reference packet 42 was spoofed as a request coming from victim 10), and includes the slave's ingress address in the payload of the traceback packet 47. Once traceback packet 47 arrives at reflector's router 48, depending on the settings, router 48 may pass the traceback packet 47 to its traceback-enabled interface 88 or to reflector 18. Reflector 18, depending on its settings, may generate a response packet 44 to request 42.

Figure 3A:
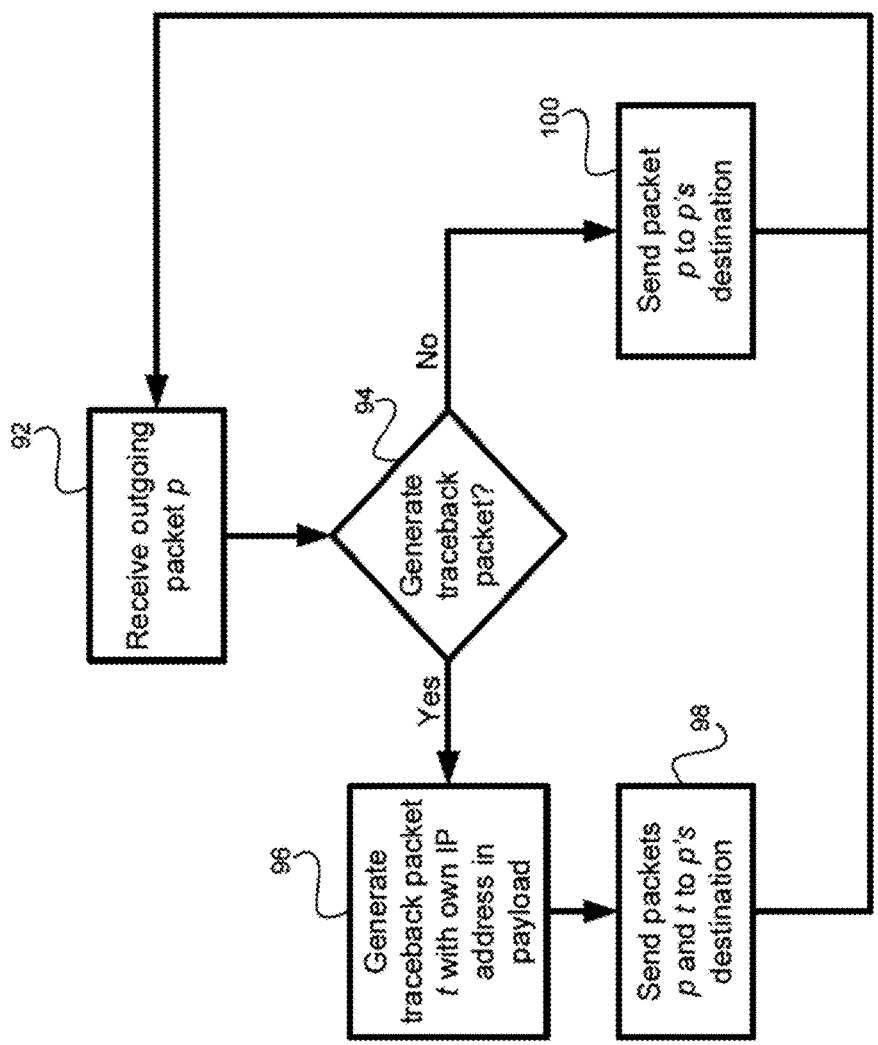
FIG. 3A illustrates the flow chart for basic traceback packet generation.

FIG. 3A illustrates a flowchart for one embodiment of basic traceback packet generation. After receiving an outgoing packet p at step labeled 310, the traceback-enabled device decides whether to generate a traceback packet at step labeled 320. This decision may be based on random number generation as described above. If the traceback-enabled device decides against generating a traceback packet, at step labeled 330 it sends the original packet p to its destination. If, however, at step 340 the traceback-enabled device decides to generate a traceback packet, it generates a packet t and populates the payload with its own IP address (i.e. the IP address of the traceback-enabled device) at step labeled 350. At step 360, the device sends both original packet p and traceback packet t to their destination.

The traceback-enabled device may employ different methods of selecting the reference packet for which a traceback packet will be generated. As mentioned above, in one embodiment, this can be done with a random number generator. In another embodiment, the traceback-enabled device may have a counter that increments with every incoming packet. The reference packet may be the packet for which the counter reaches n. Once the reference packet is identified and the traceback packet is generated, the counter resets to 0. In some embodiments, identification of the reference packet may also, at least in part, depend on the incoming and outgoing packet information. For example, if the traceback-enabled device determines that a particular destination address appears frequently in the packets, n can be reduced. Other embodiments in which the traceback device considers information in packets, to determine a reference packet are contemplated.

The traceback-enabled device drops all incoming packets with the Reserved Flag set to 1. Such packets are either erroneous or an attempt by an attacker to subvert traceback by creating fake traceback packets. The traceback-enabled device forwards all outgoing packets with the Reserved Flag set to 1 in the usual manner. The traceback-enabled device recognizes such packets for valid traceback packets generated by other traceback-enabled devices.

The real advantage of the out-of-band IP traceback using IP packets is the simplicity of the reconstruction procedure.

Victim 10 simply extracts the payload of the traceback packet, which is the IP address of the traceback-enabled device.

Tracing Reflectors

The basic procedure enables traceback of the last leg of the attack. In other words, in a purely reflector-based attack, victim 10 would only be able to determine the origin of reflectors. Enhancements to the basic procedure overcome this shortcoming.

Sending Out-of-Band IP Traceback Packets to the Source

Figure 4:
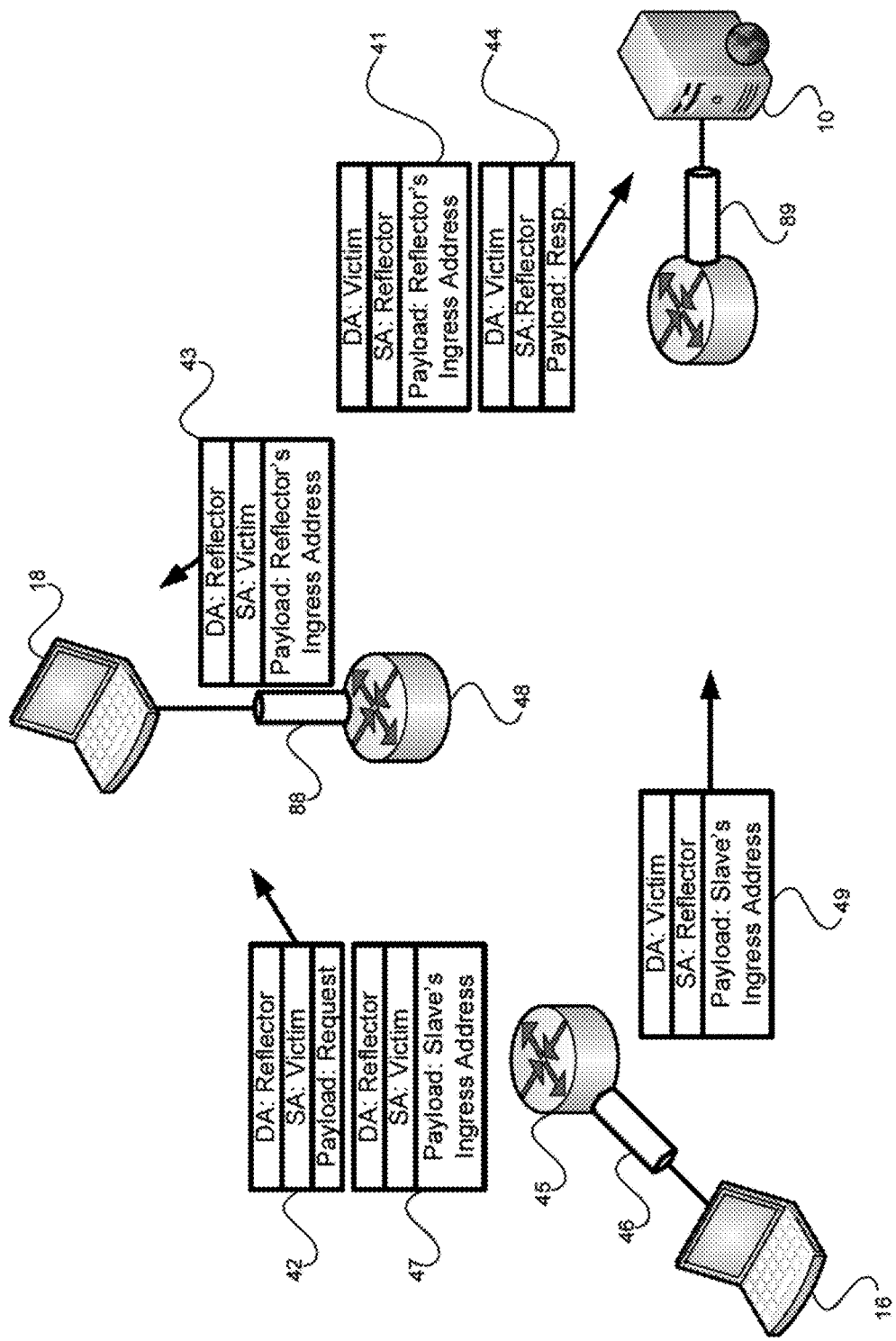
FIG. 4 illustrates the forward and reverse traceback mechanism and the actors involved.

The first enhancement is predicated on the observation that in order for a slave to make a reflector send packets to the victim, the slave must send a packet to the reflector with the source address being the victim's address. FIG. 4 illustrates this. Slave 16 sends packet 42 to reflector 18. The packet has the destination address field set to the address of reflector 18. Indeed, reflector 18 would not get this packet otherwise. But, the source address field is set to the address of victim 10. This way, reflector 18 responds to packet 42, with packet 44 addressed to victim 10.

If the traceback-enabled device 46, to which slave 16 connects (on router 45), implements the basic method disclosed above, then the traceback packet would be directed to reflector 18. Similarly, if the traceback-enabled device, to which reflector 18 connects (on router 48) implements the basic method, then the traceback packets from this traceback-enabled device would be directed to victim 10. But victim 10 would only be able to ascertain the addresses of reflectors because slaves do not have to send packets directly to the victim.

The basic approach can be modified as follows: the traceback-enabled device creates half (or some other subset) of traceback packets where the destination address is set to the source address of the reference packet and the source address field is set to the destination address of the reference packet. In other words, the destination address field and the source address field in the traceback packet are flipped, compared to the basic approach. The payload of the traceback packet is still the IP address of the traceback device. Additionally, the payload of the traceback packet has to contain an indicator that the destination address and source address fields were flipped and the traceback packet provides traceback information of a potential slave. The remaining traceback packets continue to be generated as in the basic method, without flipping the source and destination addresses.

In FIG. 4, the traceback-enabled device on router 45 to which slave 16 is connected generates both types of traceback packets. Specifically, this traceback-enabled device has generated traceback packet 47 with packet 42 being the reference packet. In packet 42, destination address field is set to the IP address of reflector 18 and the source address field is set to the IP address of victim 10. In traceback packet 47, the destination address field is set to the IP address of victim 10 and the source address is set to the IP address of the reflector. Additionally, the payload of packet 47 contains a flip flag indicating that the source address field and destination address fields are flipped as compared to the reference packet, packet 42. The regular traceback packet 49, also illustrated in FIG. 4, contains a destination address set to victim 10, the source address set to reflector 18, and the payload of the slave 16's ingress address. The regular traceback packet 49 is sent by traceback-enabled device 46 directly to slave 10.

When victim 10 receives traceback packet 49, it determines that it is a traceback packet. By examining packet 49 further, victim 10 determines that the flip flag is set. Victim 10 also determines address of the traceback-enabled device 46 on router 45. From this information, victim 10 determines that a slave connected to the traceback-enabled device 46 on router 45 participates in reflector-based attack by sending packets to reflector 18 with victim 10's source address.

Traceback-enabled device 88 on router 48 may also implement this embodiment of the traceback method. For example, in this scenario, in response to request packet 42, reflector 18 generates response packet 44 and sends it to router 48. Upon receiving response packet 44, the traceback-enabled device 88 on router 48 generates a traceback packet 41, setting the traceback packet 41's destination address to the destination of response packet 44, and setting the traceback packet 41's source address to the source of response packet 44. As explained above, for a certain portion of the response packets, the generated traceback packets will have flipped source and destination addresses, as illustrated by packet 43.

In one embodiment, the regular traceback packets is generated for approximately each n packets and flip traceback packets are generated for approximately each n packets. This means that for approximately each n traffic packets, two traceback packets.

Figure 4A:
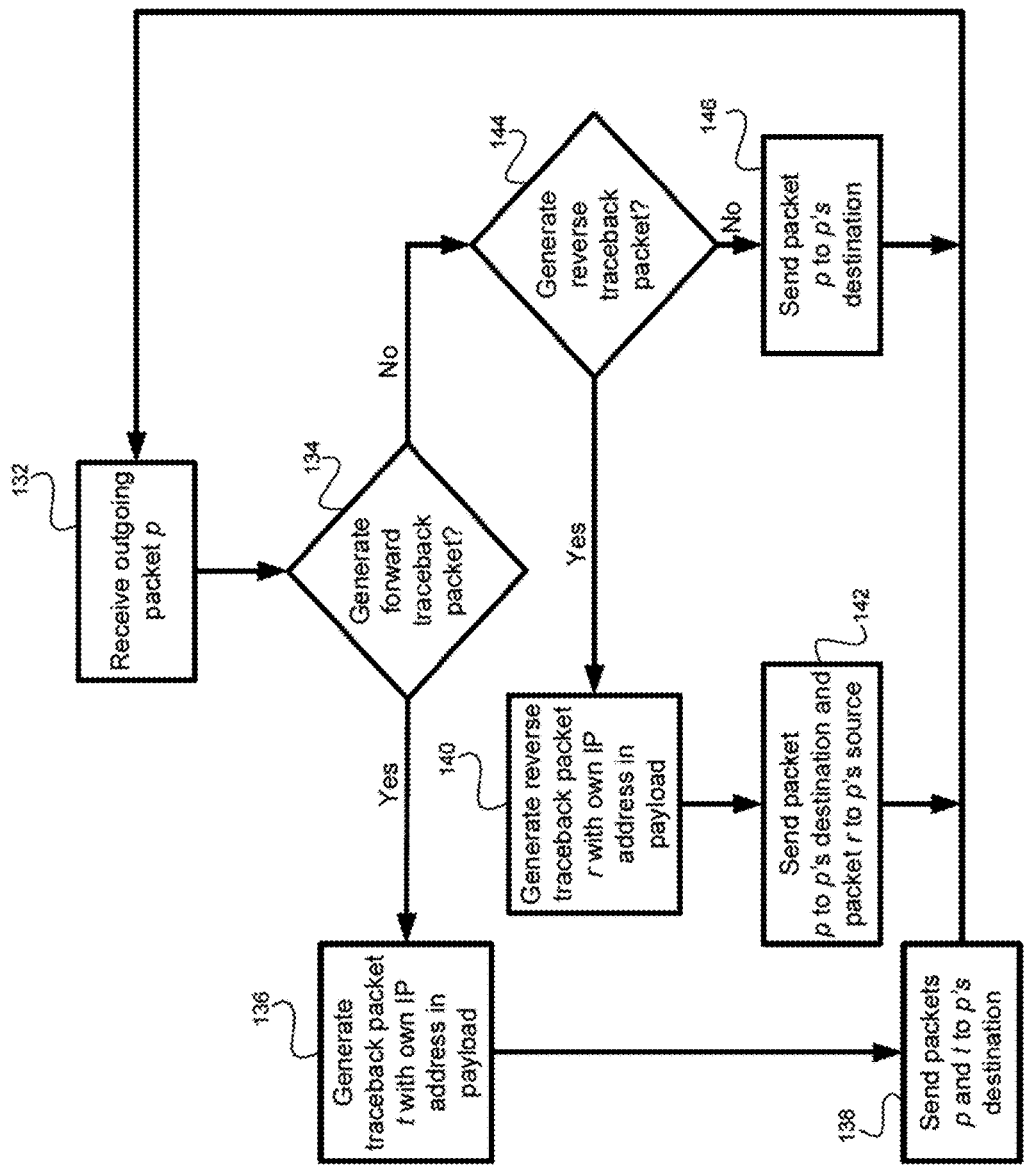
FIG. 4A illustrates the flow chart for the generation of forward and reverse traceback packet generation.

FIG. 4A illustrates one embodiment of the decision process in generating out-of-band IP traceback packets. After receiving an outgoing packet p at step labeled 400, the traceback-enabled device decides whether to generate a traceback packet at step labeled 410. This decision may be based on random number generation as described above. If the traceback-enabled device decides against generating a traceback packet, at step labeled 420 it reaches another decision point of whether to generate a reverse traceback packet. If the device decides against generating a reverse traceback packet, at step labeled 430 it sends packet p to p's original destination. If the device decides to proceed with packet generation at step 420, at step 440 it generates the reverse traceback packet r with the traceback-enabled device's own IP address in the r packet's payload. The device then sends packet p to p's destination, and packet r to p's source. Turning back to the initial decision point 410, if the device decides to generate traceback packet t, it populates packet t's payload with the traceback-enabled device's own IP address. The device then sends packets p and t to p's destination.

Sending Two IP Addresses in a Single Traceback Packet

An alternative enhancement relies on the fact that in a DDoS attack involving reflectors, a reflector and its traceback device receive the traceback packet with the ingress address information of a slave (or a stepping stone, or the attacker.) In this case the reflector's traceback device can forward this address to the victim when the reflector responds to the spoofed request from the victim. In the normal course of internet communications, the source of the communication would simply receive a traceback packet with its own ingress address and the server to which the communication was directed ingress.

Figure 5:
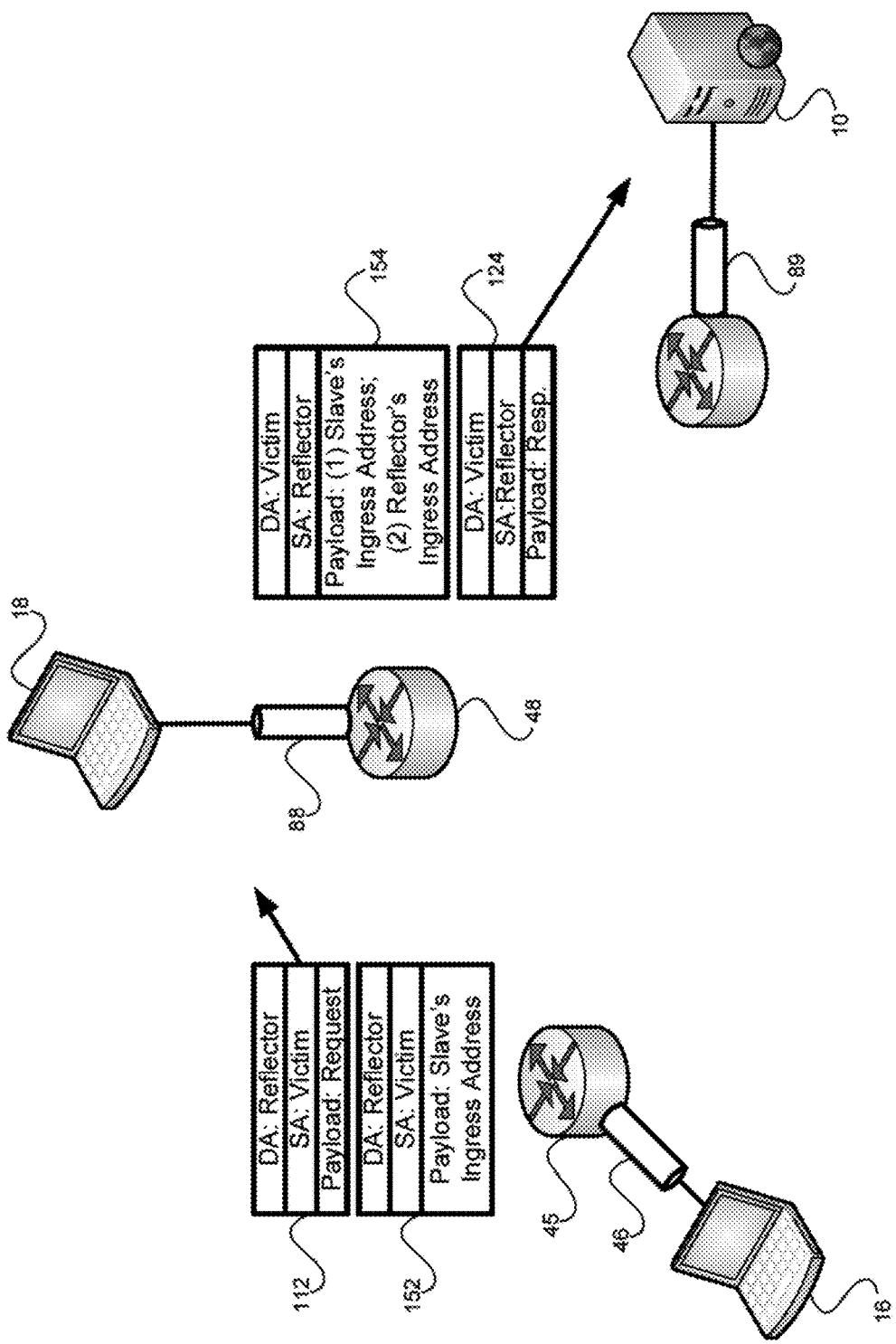
FIG. 5 illustrates the dual IP address traceback mechanism and the actors involved.

FIG. 5 shows this embodiment in greater detail. FIG. 5 shows slave 16 sending packet 112 with a request spoofing its source address for that of victim 10. Assuming that the traceback device on router 116 determines that packet 112 is a reference packet and generates traceback packet 152. In traceback packet 152, traceback device sets the destination address field to the IP address of reflector 18 and the source address field to the IP address of victim 10. But the payload is set to the ingress IP address of the slave. The traceback device on router 118 realizes that it received a traceback packet with only one IP address in the payload. The traceback device on router 118 stores traceback packet 152 and waits for the response from reflector 18. When traceback device on router 118 sees the response 124 to spoofed packet 152 it generates a new traceback packet 154. In traceback packet 152, traceback device sets the destination address field to the IP address of victim 10, source address of reflector 18, and the payload to the reflector's ingress address and to the slaves ingress address, copied from stored packet 152. Once response packet 125 and traceback packet 154 are sent, packet 152 is discarded.

Figure 5A:
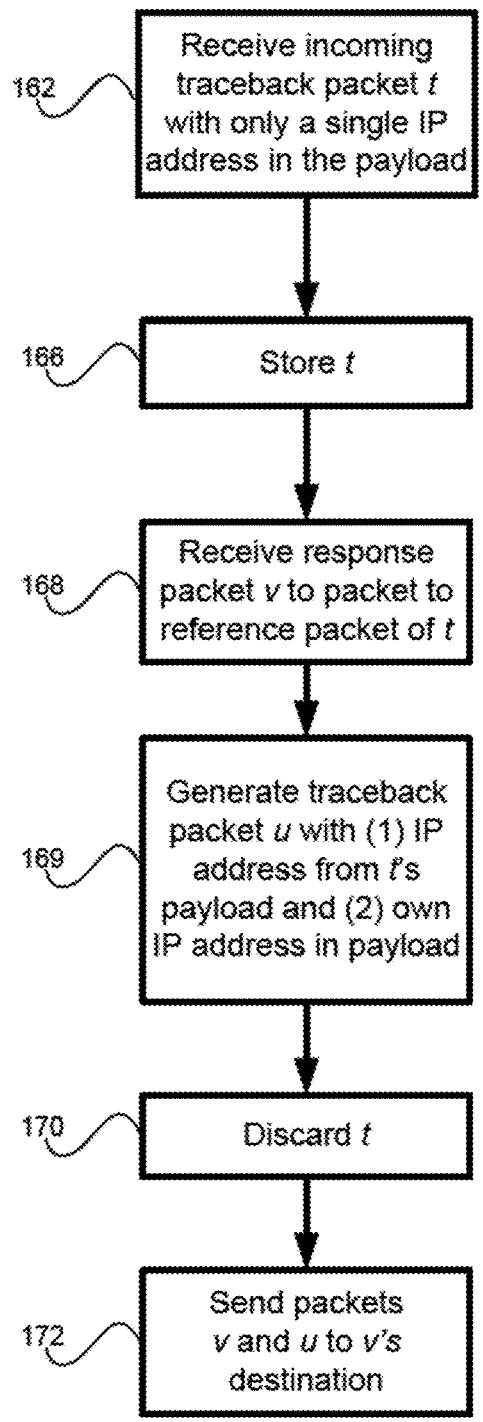
FIG. 5A illustrates the flow chart for the generation of traceback packets with two IP addresses contained therein.

FIG. 5A shows the flowchart of an embodiment of this method. Note that the steps shown in FIG. 5A work in conjunction with the steps shown in FIG. 4A related to outgoing packets. Specifically, in step 162 the traceback device receives an incoming traceback packet t with a single IP address in the payload. Note that if the traceback packet has two IP addresses in the payload, then no further processing is needed. In step 166, the traceback device stores traceback packet t. In step 168, the traceback device receives the response to the reference packet of traceback packet t. In some embodiments, this determination is performed based only on destination address and source address. Specifically, if the source address of outgoing packet v is the same as the destination address of stored traceback packet t and the destination address of outgoing packet v is the same as the source address of stored traceback packet t, then the traceback device proceeds to further processing. In other embodiments, the traceback device may perform a more elaborate analysis based on other fields of the outgoing packet v's and stored traceback packet t's headers. Also, relevant for this step, it is not essential whether the traceback device will correctly determine the response to the actual stored traceback packet t's reference packet. It is sufficient that the source and destination addresses match as discussed above.

In step 169, the traceback device generates its own traceback packet u using outgoing packet v as a reference, copying required fields per discussion above. The payload in traceback packet u contains two IP addresses: the traceback device's own IP address and the ingress IP address copied from traceback packet t. In step 170, the traceback device discards traceback packet t. In step 172, the traceback device sends reference packet v and traceback packet u to packet v's destination.

Turning back to FIG. 5A, if the destination is a victim of a reflector-based DDoS attack then one IP address in the payload of traceback packet u is the ingress address of the computer that sent spoofed requests to the reflector, and the second IP address is the reflector's ingress address.

Traceback Server

Figure 6:
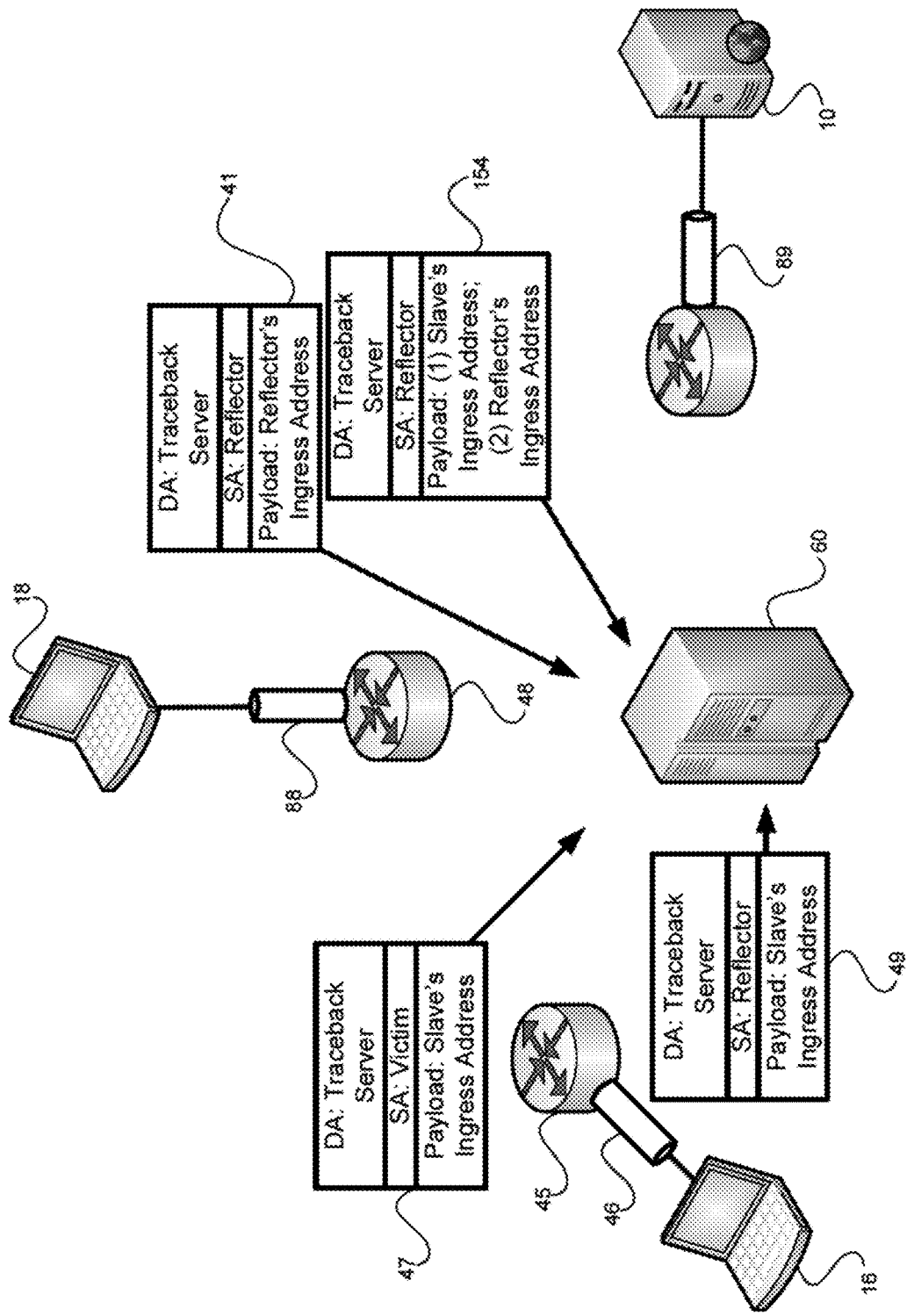
FIG. 6 illustrates an embodiment of a traceback server.

In certain configurations, it may be desired to send traceback packets to a server specifically set up to process and collect traceback information. This scenario is illustrated in FIG. 6. Slave 16, reflector 18, and victim 10, as well as the traceback-enabled devices 46, 48, and 89 to which they connect are the same exemplary devices as illustrated earlier. Similarly, traceback packets 47, 49, 41, and 154 are the same traceback packets discussed earlier. However, in this embodiment, the traceback packets are not addressed to the reflector or victim as was the case earlier. Here, all of the traceback packets are addressed to traceback server 60. Server 60 may be a server dedicated solely to managing traceback information, or it may be a more general server that allocates certain resources to managing traceback information. This embodiment offers several benefits.

For example, by sending traceback information to a dedicated or semi-dedicated traceback server, the method relieves ordinary routers, network interfaces, and other hosts from overhead caused by having to process received traceback packets. Additionally, the existence of traceback servers enables for a more centralized collection of information relating to DDoS and other types of Internet attacks. The traceback servers may be configured to provide traceback information upon request.

Moreover, traceback servers may perform a surveillance function. Specifically, even with the basic traceback mechanism, the traceback server will have the information about the traffic patterns of various computers on the Internet. With a relatively simple modification, trace-back enabled devices may include further information about the reference packet. For example, traceback packets may include a timestamp, information on higher layer protocols, etc. In one embodiment, a traceback packet may include the entire or truncated copy of the reference packet. Depending on the observed activity, the traceback server may instruct certain traceback interface to include more or less information in the traceback packets and to increase the frequency of the traceback packets generation.

Figure 7:
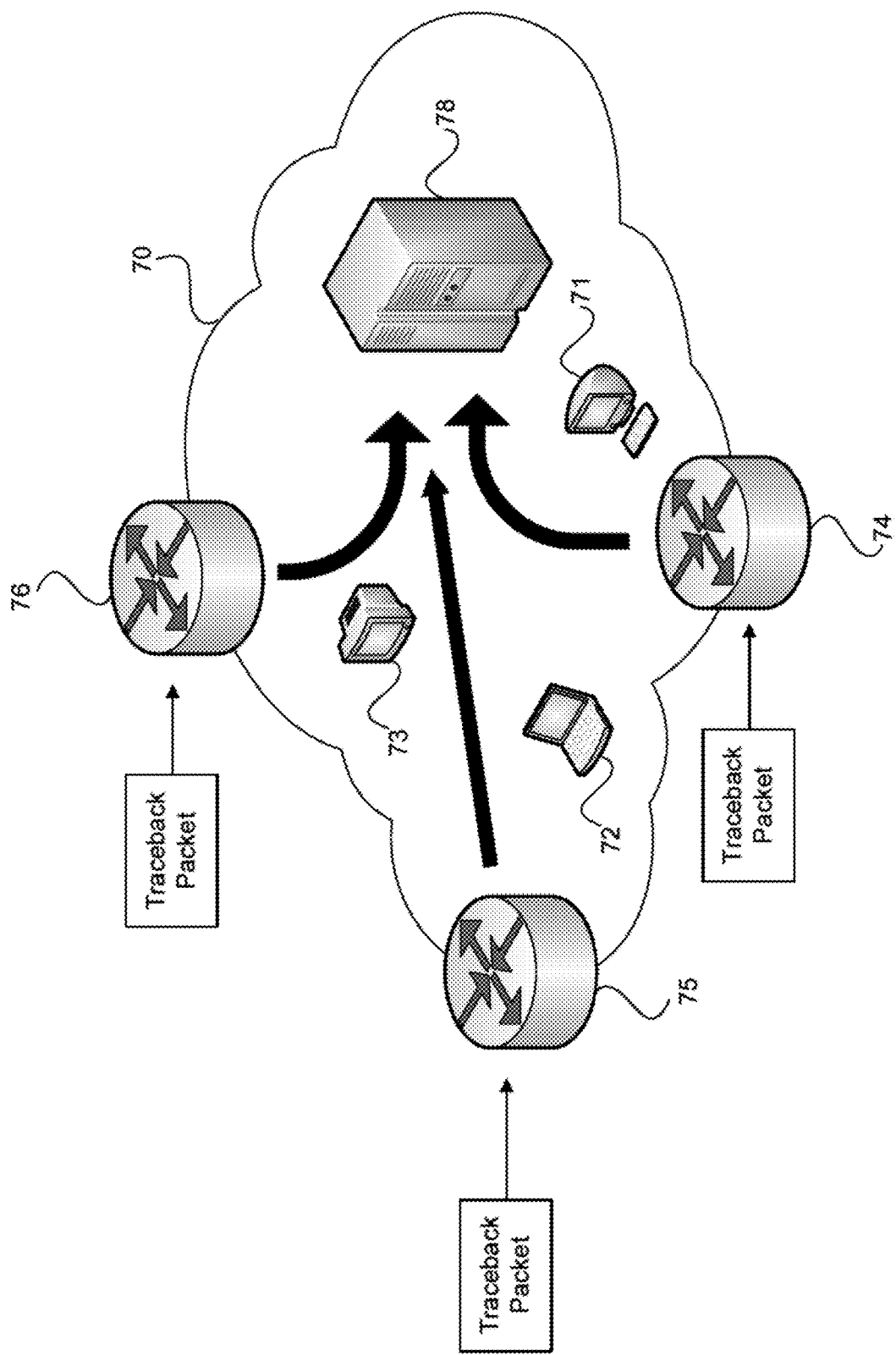
FIG. 7 illustrates an implementation of a traceback server on a corporate network.
Figure 8A:
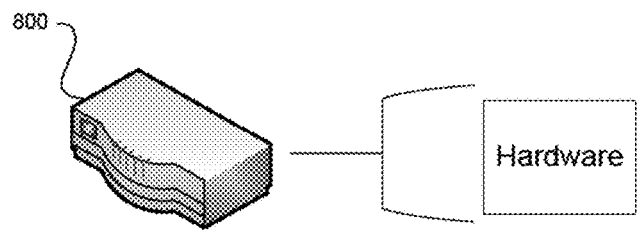
FIG. 8A illustrates the traceback mechanism being implemented using hardware only.
Figure 8B:
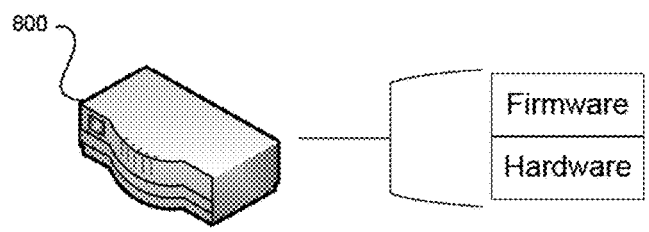
FIG. 8B illustrates the traceback mechanism being implemented using a combination of hardware and firmware.
Figure 8C:
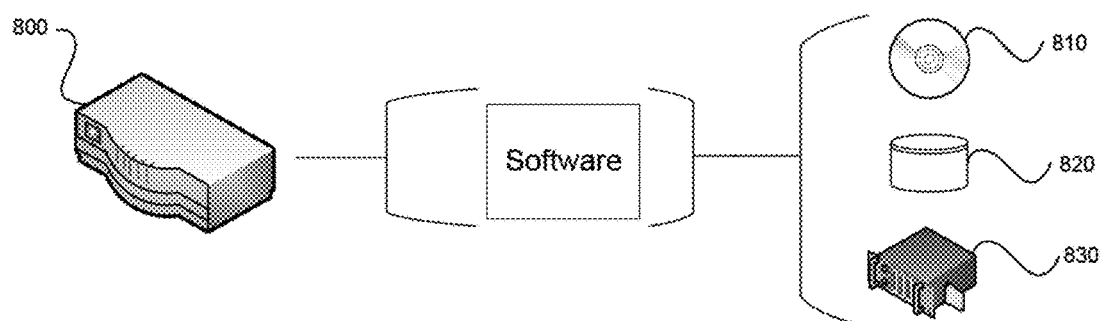
FIG. 8C illustrates the traceback mechanism being implemented using software.
Figure 8D:
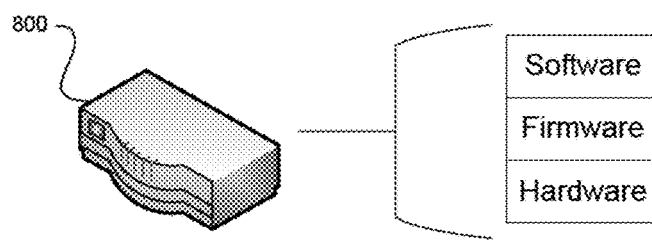
FIG. 8D illustrates the traceback mechanism being implemented on a network device with a combination of hardware, software, and firmware.

One embodiment of a traceback server is illustrated in FIG. 7. Cloud 70 illustrates a corporate network, with routers 74, 75, and 76 located at the edges of the network. Server 78 is the traceback server, and it manages traceback processing for the corporate network. While the network has a number of internal computers such as 71, 72, and 73, to which traceback packets may be addressed (for example where 72 is the victim of a DDoS attack), the edge routers have been configured to forward all traceback packets to traceback server 78. One way for edge routers to recognize traceback packets is by checking the Reserved Flag. As noted earlier, in one embodiment the traceback-enabled devices set the Reserved Flag to 1 for generated traceback packets.

Configurations that utilize a centralized, dedicated, or semi-dedicated traceback servers allow for the collection of traceback information and corresponding analytics processing. Traceback servers can be used to locate troublesome networks, players, or groups of players on the Internet. Different permission settings and pricing schemes may be implemented, whereby certain entities obtain access to stored traceback information.

It will be understood by those of ordinary skill in the art that the traceback server can comprise one or more computers, and may be implemented at various locations on the Internet and at various levels of network topology.

Implementation

The traceback system and method described herein can be implemented as software, hardware, firmware, or some combination thereof. A hardware traceback implementation offers the advantages of speed and efficiency. For example, in one embodiment, a router with a dedicated hardware traceback module may perform all steps of the traceback mechanism without burdening the general purpose processors and memory found in modern routers. In addition, the hardware traceback module can be specifically designed to function with a desired speed, throughput, and bandwidth. As power efficiency becomes more important in computer networking systems, the module can be optimized to consume less power than other possible implementations. Specifically designed hardware, however, comes with several drawbacks, such as relatively expensive design costs and lack of configurability.

In another embodiment, the traceback mechanism is implemented using a combination of hardware and firmware. Firmware can be considered a set of computer instructions that are permanently stored on a device's memory and work directly with low-level hardware components, as opposed to software which usually, albeit not always, functions several computer layers above the hardware. Firmware offers the advantage of being reprogrammable, and therefore if the manufacturer needs to update the traceback algorithm, or fix a discovered bug, firmware is more flexible than a pure hardware implementation. Since firmware works very closely with hardware components, it still offers significant speed, which is important in high traffic networking applications. However, due to firmware's semi-permanent nature, any change to the firmware results in some outage for the device. Thus, in order to tweak a traceback module implemented in hardware and firmware, the module would typically have to be taken out of service while the new firmware was transferred to the device.

In another embodiment, the traceback mechanism is implemented in software. Software offers the greatest flexibility because it does not require any hardware or firmware redesign, and can usually be updated fairly quickly. Another advantage of software is that, in some embodiments, it can be modified independently of the underlying hardware, and any updates will not cause interruptions to the device. For example, a software component of traceback implementation running on a router may offer the ability to modify certain settings on the fly, without impacting the basic routing functions of the device, and therefore without impacting its core functions.

Yet, in certain other embodiments, the traceback method can be implemented using field programmable gate arrays (or FPGAs), programmable logic devices (PLDs), or similar technology, which provides hardware components that can be rearranged to perform different functions (sometimes on the fly). The advantage of implementing the traceback mechanism with this technology is that it requires no custom hardware development, while offering speed that can be crucial in networking applications.

FIG. 8 illustrates the various implementations of the traceback mechanism. In FIG. 8A, the traceback mechanism is implemented using hardware only on network device 800. In FIG. 8B, the traceback mechanism is implemented using a combination of hardware and firmware on network device 800. In FIG. 8C, the traceback mechanism is implemented using software on network device 800. The software module can be made available on a CD or DVD 810, a disk storage device 820, or network storage device 830. In FIG. 8D, the traceback mechanism is implemented on network device 800 with a combination of hardware, software, and firmware.

Additional Features

In recent years, computer attacks have grown more sophisticated, gaining the ability to hijack additional networks, jump from one network to another, and generally adapting to defense mechanisms encountered by the attack. It may therefore be desired to provide the traceback mechanism with additional features that provide flexibility and enhancements when dealing with more sophisticated threats.

Analytics

Network administrators, particularly those managing medium to large sized networks, are usually quick to react to cyber attacks and make changes to their network equipment to prevent or contain damage to their systems. However, to make meaningful changes, the administrators must have some information about an ongoing or impending attack on their network. Therefore, in one embodiment, traceback devices collect data and statistics on passing network traffic and make it available to network management personnel. The collected data may include any generated or received traceback packets, including the source and destination IP address, along with the IP address(es) contained in the payloads of the traceback packets. Other collected data may include the IP addresses of devices from which traceback packets are received.

Traceback devices can also perform analysis on the collected traceback data, including estimating the frequency with which other traceback devices generate traceback packets. Additional analysis may indicate which traceback devices, and which networks, are subjected to more frequent or significant attacks. Similarly, analysis of traceback data may indicate which devices and networks do a poor job of detecting or adapting to cyber attacks.

The data, statistics, and analysis provided by the traceback devices can be made available to network administrators in several ways, including log files, databases, or prepared reports. All of these can be stored either locally on the traceback device, or network storage space. Network administrators may also desire to receive email reports of significant traceback events, depending on their preference, or they may desire to receive a periodic report with some general indicators. Should an administrator desire to examine the data in more detail, he or she should be able to request a more specific report or run a query with the desired parameters.

Configuration Data and Updates

Based on the collected data, or some other information, network administrators may wish to adjust the settings of one or more traceback devices. For example, some traceback devices may be generating traceback packets too frequently, reducing throughput, and an administrator may wish to reduce the frequency with which reference packets are selected. It may also be possible that an update to the traceback mechanism has become available, and the administrator wants to implement the update on his or her devices.

To do this, the system offers several options to the administrator. The administrator may connect to individual traceback devices or modules using a text-based configuration menu, over a serial cable or a computer network. In a preferred embodiment, the administrator connects to the traceback device using a web-based interface and adjusts the desired traceback parameters or updates the firmware and/or software. In other embodiments, the traceback devices or modules can connect to a configuration or update server on a preset schedule (or upon startup), and receive updated configuration, firmware, and/or software files. For larger networks, instead of updating each traceback device individually, network administrators can push out configuration changes and updates to several devices at the same time.

Adaptivity

In addition to manual configuration options discussed above, one aspect of the traceback mechanism is the ability to automatically adapt to incoming attacks. In one embodiment, the traceback devices are configured to change the frequency with which reference packets are selected and traceback packets are generated. For example, in one of the embodiments described above, a traceback packet is created when a number that is randomly generated for an incoming packet is less than $1/n$. To increase the frequency of traceback packet generation, the number $n$ is decreased, thereby increasing the value of $1/n$, and making it more likely that the randomly generated number is less than $1/n$. To reduce the frequency of traceback packet generation, the number $n$ is increased. In addition, the rate of change of the frequency may also increase or decrease. Thus, for example, in order to deal with an imminent threat, the traceback device may ramp up the frequency of traceback packet generation in a non-linear fashion.

The decision to increase or decrease the frequency of traceback packet generation may be based on a number of factors, including the volume of requests that appear to originate from a single computer or network, the appearance of packets bearing source addresses that could not possibly exist behind a particular ingress interface, the sensitivity of data being requested, and other analysis based on collected data and statistics.

In another embodiment of the out-of-band IP traceback method, victims and reflectors of DDoS or other types of attacks may contact the source of the attack or the network device to which the source connects, and inform them that they are participating in Internet based attacks on other computers. This is made possible by the inclusion of the IP address of the attacker in a payload of the traceback packets received by victims or reflectors. In response, the source may decide to take corrective measures, such as shutting down or alerting network staff to perform security maintenance on itself. Similarly, a networking device which receives information that a computer on its network is participating in an Internet attack, may decide to temporarily or permanently drop all packets from that computer, or perform other security measures to correct the threat.

IPv4 and IPv6

The various embodiments of the traceback mechanism described herein are compatible with both IPv4 and IPv6 versions of the internet protocol. One advantage of out-of-band IP traceback over traditional traceback methods is that it provides more room to include traceback information, such as one or more IP addresses, timestamp, and other information, placed in the payload of a traceback packet. This advantage is apparent in an IPv4 system where traditional traceback systems that rely on rarely used fields for transmitting traceback information require several packets to transmit the desired information. However, this advantage is even more apparent in an IPv6 system, where internet protocol addresses have been extended to 128-bits. Traditional traceback systems would require even more packets to transmit all of the required IPv6 traceback information, whereas out-of-band traceback can place all of the desired information in the payload of a single packet.

Installation

In the preferred embodiment, the traceback-enabled devices are interfaces on routers employed by ISPs to connect the ISP networks to the Internet. This would enable the traceback of attack packets to the originating ISP network. Yet, the traceback method described herein is scalable to fit a variety of environments and proves useful in various network configurations. The defense industry, for example, may find it imperative to detect and trace unauthorized attacks originating within its own network, and may implement the traceback mechanism described herein on devices internal to its network. To do this, an organization may treat its own local area network (LAN) or wide area network (WAN) as an "Internet" for the purpose of traceback, and enable traceback on various devices within its internal network.

The traceback-enabled devices may exist at various levels of the internal network topology. Thus, an organization can enable traceback on internal routers, switches, modems, access points, and other connectivity devices. Enabling traceback on internal network devices will provide the organization with granular traceback data, where the packets may be traced down to a particular workstation. If a particular network device is incapable of determining or working with IP addresses, other forms of identification, such as MAC addresses, may be used to implement the traceback method.

The foregoing description of the various and preferred embodiments of the present invention has been presented for purposes of illustration and explanation. It is not intended to be exhaustive nor to limit the invention to the specifically disclosed embodiments. The embodiments herein were chosen and described in order to explain the principles of the invention and its practical applications, thereby enabling others skilled in the art to understand and practice the invention. However, many modifications and variations will be apparent to those skilled in the art, and are intended to fall within the scope of the invention, claimed as follows.

What is claimed is:

1. A method of collecting and analyzing information about network traffic on a server, the method comprising:
   a. receiving a first information packet from a network device, the first information packet having been generated based on information associated with a first data packet passing through the network device;
   b. analyzing the first information packet;
   c. sending one or more instructions to the network device to modify one or more properties of a subsequently sent second information packet based on information associated with a second data packet passing through the network device subsequent to the first data packet, the second information packet including at least a partial copy of the second data packet;
   d. receiving from the network device the second information packet having the one or more properties modified based on the sent instructions; and
   e. generating an alert about a possible cyber-attack based, at least in part, on information from the second information packet.

2. The method of claim 1, wherein the one or more properties are contents of the second information packet.

3. The method of claim 2, wherein the contents include a timestamp associated with the second data packet.

4. The method of claim 1, wherein the one or more properties include a frequency with which information packets are sent by the network device.

5. The method of claim 1 further comprising collecting information from the information packets.

6. The method of claim 5 further comprising aggregating the information from the information packets.

7. The method of claim 5 further comprising allowing access to the collected information.

8. The method of claim 5, wherein the server belongs to a corporate network.

9. The method of claim 1 further comprising determining a possible source of the possible cyber-attack.

10. The method of claim 9 further comprising transmitting to a requester information about the possible source of the possible cyber-attack information.

11. An information collection server comprising:
   a. an interface receiving an initial information related to data packets passing through one or more network devices from the one or more network devices;
   b. a processor analyzing the received initial information;
   wherein the interface is configured to send one or more instructions to the one or more network devices to adapt information sent by the one or more network devices based on the analysis, wherein the adapted information includes copies or truncated copies of data packets subsequently passing through the one or more network devices, and wherein the interface is configured to receive adapted information from the one or more network devices related to the data packets subsequently passing through the one or more network devices.

12. The information collection server of claim 11, wherein the processor is further configured to determine a source of a cyber-attack.

13. The information collection server of claim 12, wherein the cyber-attack is a distributed denial of service attack.

14. The information collection server of claim 11 further comprising a memory storing the received initial information and the received adapted information, and wherein the memory is configured to provide access to the stored initial information and the stored adapted information.

15. The information collection server of claim 11, wherein the means for analyzing the processor is further configured to generate analytics based on the stored initial information and the stored adapted information.

16. The information collection server of claim 15, wherein the analytics includes traffic patterns.

17. The information collection server of claim 15, wherein the interface is further configured to transmit the generated analytics to a requestor.

18. The information collection server of claim 11, wherein the one or more instructions comprise an instruction to include a timestamp associated with packets subsequently passing through the one or more network devices.

* * * * *